US012354825B2

(12) United States Patent
Tannhäuser et al.

(10) Patent No.: US 12,354,825 B2
(45) Date of Patent: Jul. 8, 2025

(54) CIRCUIT BREAKER DEVICE AND METHOD

(71) Applicant: Siemens Aktiengesellschaft, Munich (DE)

(72) Inventors: Marvin Tannhäuser, Hausen (DE); Dominic Malane, Eichstätt (DE); Fabian Döbler, Theilenhofen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/258,609

(22) PCT Filed: Dec. 21, 2021

(86) PCT No.: PCT/EP2021/087081
§ 371 (c)(1),
(2) Date: Jun. 21, 2023

(87) PCT Pub. No.: WO2022/136424
PCT Pub. Date: Jun. 30, 2022

(65) Prior Publication Data

US 2024/0047152 A1 Feb. 8, 2024

(30) Foreign Application Priority Data

Dec. 21, 2020 (DE) ..................... 10 2020 216 416.9
Dec. 20, 2021 (EP) ..................................... 21216099

(51) Int. Cl.
*H01H 9/54* (2006.01)
*H01H 71/12* (2006.01)

(52) U.S. Cl.
CPC ............ *H01H 9/547* (2013.01); *H01H 9/548* (2013.01); *H01H 71/125* (2013.01)

(58) Field of Classification Search
None
See application file for complete search history.

(56) References Cited

U.S. PATENT DOCUMENTS

2009/0167315 A1* 7/2009 Lindsey ................. G01R 31/58 324/519
2011/0215774 A1* 9/2011 Colvin ................ H02M 1/4225 323/205

(Continued)

FOREIGN PATENT DOCUMENTS

DE 202009014759 U1 3/2010
DE 102020216396 B3 5/2022

(Continued)

*Primary Examiner* — Jared Fureman
*Assistant Examiner* — Esayas G Yeshaw
(74) *Attorney, Agent, or Firm* — Laurence A. Greenberg; Werner H. Stemer; Ralph E. Locher

(57) ABSTRACT

A circuit breaker device for a low-voltage circuit has a mechanical isolating contact unit connected in series with an electronic disconnection unit. The mechanical isolating contact unit is switched by opening contacts to prevent current flow or closing the contacts for current flow in the low-voltage circuit. The electronic disconnection circuit is switched by semiconductor-based switching elements into a high-resistance state of the switching elements or into a low-resistance state of the switching elements for current flow in the low-voltage circuit. When the amount of an instantaneous current value of the low-voltage circuit exceeds at least one current threshold value, prevention of the current flow of the low-voltage circuit is initiated. The at least one current threshold value is adjusted according to the magnitude of the voltage of the circuit breaker device.

18 Claims, 5 Drawing Sheets

(56) References Cited

U.S. PATENT DOCUMENTS

| | | | | |
|---|---|---|---|---|
| 2016/0358722 | A1 | 12/2016 | Lakshmanan et al. | |
| 2017/0004948 | A1 | 1/2017 | Leyh | |
| 2017/0256934 | A1* | 9/2017 | Kennedy | H02H 3/382 |
| 2019/0229529 | A1* | 7/2019 | Askan | H02H 1/0007 |
| 2019/0371557 | A1* | 12/2019 | Haslinger | H02H 3/08 |
| 2020/0028345 | A1* | 1/2020 | Roy | H02H 3/38 |
| 2020/0321767 | A1* | 10/2020 | Meyer | H02H 3/38 |
| 2020/0365346 | A1* | 11/2020 | Telefus | H01H 71/24 |
| 2020/0366078 | A1* | 11/2020 | Telefus | H02J 13/00022 |

FOREIGN PATENT DOCUMENTS

| | | | |
|---|---|---|---|
| DE | 102020216397 | B3 | 5/2022 |
| DE | 102020216413 | A1 | 6/2022 |
| DE | 102020216416 | A1 | 6/2022 |
| EP | 3700038 | A1 | 8/2020 |
| WO | WO 2020169753 | A1 | 8/2020 |
| WO | WO 2020169765 | A1 | 8/2020 |
| WO | WO 2020169773 | A1 | 8/2020 |
| WO | WO 2020169774 | A1 | 8/2020 |
| WO | WO 2020169780 | A1 | 8/2020 |

* cited by examiner

CIRCUIT BREAKER DEVICE AND METHOD

FIELD AND BACKGROUND OF THE INVENTION

The invention relates to the technical field of a circuit breaker device for a low-voltage circuit having an electronic interruption unit and to a method for a circuit breaker device for a low-voltage circuit having an electronic interruption unit.

Low voltage means voltages of up to 1000 volts AC or up to 1500 volts DC. Low voltage means in particular voltages that are greater than the extra-low voltage, with values of 50 volts AC or 120 volts DC.

Low-voltage circuit or grid or installation means circuits having nominal currents or rated currents of up to 125 amps, more specifically up to 63 amps. Low-voltage circuit means in particular circuits having nominal currents or rated currents of up to 50 amps, 40 amps, 32 amps, 25 amps, 16 amps or 10 amps. The stated current values mean in particular nominal, rated or/and breaking currents, i.e. the maximum current normally carried via the circuit or usually resulting in the electrical circuit being interrupted, for example by a protective device, such as a circuit breaker device, miniature circuit breaker or power breaker.

Miniature circuit breakers are overcurrent protective devices that have been known for a long time and are employed in low-voltage circuits in electrical installation engineering. They protect lines from damage as a result of heating due to excessively high current and/or short circuit. A miniature circuit breaker can automatically break the circuit in the event of overload and/or short circuit. A miniature circuit breaker is a fusing element that does not automatically reset.

Power breakers, in contrast to miniature circuit breakers, are provided for currents greater than 125 A, in some cases even from as little as 63 amps. Miniature circuit breakers are therefore of simpler and more delicate design. Miniature circuit breakers normally have a mounting option for mounting on what is known as a top-hat rail (mounting rail, DIN rail, TH35).

Miniature circuit breakers are of electromechanical design. They have a mechanical switching contact or open-circuit shunt release in a housing in order to interrupt (trip) the electric current. A bimetallic protective element or bimetallic element is normally used for tripping (interruption) in the event of longer-lasting overcurrent (overcurrent protection) or in the event of thermal overload (overload protection). An electromagnetic trip with a coil is employed for brief tripping when an overcurrent limit value is exceeded or in the event of a short circuit (short circuit protection). One or more arc extinguishing chamber(s) or devices for arc extinction are provided. In addition, connecting elements for conductors of the electrical circuit that is to be protected.

Circuit breaker devices having an electronic interruption unit are relatively novel developments. They have a semiconductor-based electronic interruption unit. That is to say that the flow of electric current in the low-voltage circuit is carried via semiconductor components or semiconductor switches that are able to interrupt the flow of electric current or to be switched on. Circuit breaker devices having an electronic interruption unit also frequently have a mechanical isolating contact system, in particular having isolator properties according to relevant standards for low-voltage circuits, the contacts of the mechanical isolating contact system being connected in series with the electronic interruption unit, i.e. the current in the low-voltage circuit to be protected is carried via both the mechanical isolating contact system and the electronic interruption unit.

In the case of semiconductor-based circuit breaker devices or protection equipment, solid-state circuit breakers, SSCB for short, the switching energy does not need to be converted into an arc as in the case of a mechanical switching device, but rather needs to be converted into heat by means of an additional circuit, the energy absorber. The breaking energy comprises the energy stored in the circuit, i.e. in the grid, line or load impedances. In order to relieve the load on the energy absorber, the current flowing at the time of breaking needs to be as small as possible. This also applies in the case of a short circuit. Here, the current rises very quickly. Rapid short-circuit detection allows a short circuit to be detected early and an excessively high short-circuit current to be avoided. The semiconductor-based circuit breaker device interrupts the circuit, within the context of a break operation, almost without delay, within μs. No high currents arise and the load on the energy absorber of a semiconductor-based circuit breaker device is reduced. Known short-circuit detection systems or break criteria are normally based on the ascertainment and evaluation of the actual value of the current.

The present invention relates to low-voltage AC circuits, having an AC voltage, normally having a time-dependent sinusoidal AC voltage at the frequency f, typically 50 or 60 hertz (Hz). The time dependency of the instantaneous voltage value u(t) of the AC voltage is described by the equation:

$$u(t)=U^{*}\sin(2\Pi^{*}t),$$

where:

u(t)=instantaneous voltage value at the time t

U=amplitude (maximum value) of the voltage

A harmonic AC voltage can be represented by the rotation of a vector, the length of which corresponds to the amplitude (U) of the voltage. The instantaneous deflection is the projection of the vector onto a coordinate system. One oscillation period corresponds to one full revolution of the vector, and the full angle thereof is 2Π (2pi) or 360°. The angular frequency is the rate of change of the phase angle of this rotating vector. The angular frequency of a harmonic oscillation is always 2Π times its frequency, i.e.:

$$\omega=2\Pi^{*}f=2\Pi/T=\text{angular frequency of the } AC \text{ voltage}$$

(T=period duration of the oscillation)

The indication of angular frequency (co) is often preferred over frequency (f), since many formulae in oscillation theory can be represented more compactly using angular frequency on account of the occurrence of trigonometric functions, the period of which is by definition 2Π:

$$u(t)=U^{*}\sin(\omega t)$$

The term instantaneous angular frequency is also used in the case of angular frequencies that are not constant over time.

In the case of a sinusoidal AC voltage, in particular one that is constant over time, the time-dependent value comprising the angular velocity ω and the time t corresponds to the time-dependent value φ(t), which is also referred to as the phase angle φ(t). That is to say that the phase angle φ(t) periodically passes through the range 0 . . . 2Π, or 0° . . . 360°. That is to say that the phase angle periodically assumes a value between 0 and 2Π, or 0° and 360° (φ=n*(0 . . . 2Π), or φ=n*(0° . . . 360°, due to periodicity; in short: φ=0 . . . 2Π, or φ=0° . . . 360°.

Instantaneous voltage value u(t) therefore means the instantaneous value of the voltage at the time t, i.e. for a sinusoidal (periodic) AC voltage the value of the voltage at the phase angle φ (φ=0 . . . 2Π, or φ=0° . . . 360°, of the respective period).

SUMMARY OF THE INVENTION

The object of the present invention is to improve a circuit breaker device of the type mentioned at the outset, in particular to demonstrate a way for the electronic interruption unit to reliably prevent a flow of electric current in the event of a short circuit or overcurrent occurring, i.e. in the event of at least one current threshold value being exceeded.

This object is achieved by a circuit breaker device as claimed and by a method as claimed.

According to the invention, there is provision for a (electronic) circuit breaker device for protecting an electrical low-voltage circuit, in particular low-voltage AC circuit, comprising:

a housing having first, in particular grid-side, and second, in particular load-side, connections for conductors of the low-voltage circuit, a mechanical isolating contact unit connected in series with an electronic interruption unit, wherein in particular the mechanical isolating contact unit is associated with the (second) load-side connections and the electronic interruption unit is associated with the (first) grid-side connections, that the mechanical isolating contact unit can be switched by opening contacts in order to prevent a flow of current or by closing the contacts for a flow of current in the low-voltage circuit, that the electronic interruption unit can be switched by semiconductor-based switching elements to a high-impedance state of the switching elements in order to prevent a flow of current or to a low-impedance state of the switching elements for the purpose of current flow in the low-voltage circuit, a current sensor unit in order to ascertain the level of the current of the low-voltage circuit, in such a way that instantaneous current values are available, a voltage sensor unit in order to ascertain the level of the voltage of the low-voltage circuit, in such a way that instantaneous voltage values are available, a control unit connected to the current sensor unit, to the voltage sensor unit, to the mechanical isolating contact unit and to the electronic interruption unit, wherein the exceeding of at least one current threshold value (in particular in terms of absolute value) results in prevention of a flow of current in the low-voltage circuit being initiated, that the circuit breaker device is configured in such a way that the at least one current threshold value is adjusted on the basis of the level of the voltage in the low-voltage circuit.

This has the particular advantage that the circuit breaker device can reliably prevent an overcurrent or short circuit, in particular by way of the electronic interruption unit, i.e. can break, in the event of said overcurrent or short circuit occurring. In this context, reliably here means that the semiconductor-based switching elements (e.g. power semiconductors) are protected against thermal destruction. The break power of the electronic interruption unit, in particular the (power) semiconductors thereof, is limited by the (present) voltage, in particular by the amount of energy provided at high voltages, which amount could lead to thermal overload. In order to attain reliable breaking (to ensure said breaking when at least one current threshold value is exceeded) without the electronic interruption unit, in particular the (power) semiconductors thereof, being overdimensioned, the level of the at least one current threshold value is adjusted on the basis of the level of the voltage in the low-voltage circuit. As such, the invention allows simple units to be used to attain a high degree of efficiency and a high level of economic benefit.

Advantageous configurations of the invention are specified in the subclaims.

In one advantageous configuration of the invention, the circuit breaker device is configured in such a way that the at least one current threshold value is adjusted on the basis of the level of the voltage in such a way that decreasing voltage results in the at least one current threshold value being lowered and that increasing voltage results in the at least one current threshold value being raised, in particular being raised up to a maximum value of the at least one current threshold value.

Advantageously, low voltages thus result in the current threshold value (the current threshold) being lowered, because low voltages and high currents can result in a large amount of heat being input, which is thus better detected in order to thus make maximum use of the current-carrying capability or thermal capacity, in particular of the electronic interruption unit, more specifically of the (power) semiconductors thereof.

For AC voltages, there is the possibility of only a very low voltage, e.g. 10 V, being applied to the energy-source-side connection (grid connection) at the moment of the short circuit. This results in breaking not occurring immediately when the short circuit occurs, since the low voltage means that only a small short-circuit current flows. After a short time, typically in the region of 1-3 ms, the AC voltage on the energy-source-side connection (grid connection) rises, and so a sufficiently large current flows for breaking. This delayed breaking produces an increased thermal load for the electronic interruption unit, in particular the semiconductor-based switching elements (the electronic switch) thereof, since the semiconductor chip employed in the semiconductor-based switching elements of the electronic interruption unit has a very low thermal capacity and therefore a very short thermal time constant (typically less than 1 ms). The solution described reduces the current threshold for the electronic interruption unit to break when the instantaneous value of the voltage is low, and so said interruption unit breaks quickly even at low voltages and the semiconductor-based switching elements, or the semiconductor chip thereof, of the electronic interruption unit are protected against thermal destruction.

In one advantageous configuration of the invention, the circuit breaker device is configured in such a way that the at least one current limit value is continually adjusted. Furthermore, in particular an adjustment that is faster than 20 ms, specifically faster than 10 ms or preferably faster than 1 ms, can be made.

This has the particular advantage that the current threshold value is quickly carried along so as to attain a maximum utilization level for the electronic interruption unit, in particular the (power) semiconductors thereof, and thus a high economic utilization level is attained.

In one advantageous configuration of the invention, the circuit breaker device is configured in such a way that the instantaneous current value of the ascertained level of the current is compared with the at least one current threshold value by means of an analog comparator in such a way that the absolute value of the current exceeding the absolute value of the at least one current threshold value results in the prevention of the flow of current in the low-voltage circuit being initiated.

In this context, the absolute value of the current exceeding the absolute value of the at least one current threshold value reasonably means the current threshold value being exceeded in the event of a positive current value and a negative current threshold value (of identical absolute value) being undershot in the event of a negative current value (AC current). This could also be implemented by way of an absolute-value comparison.

This has the particular advantage that fast prevention of a flow of current (breaking), in particular by the electronic interruption unit, is achieved.

Instantaneous current value means for example an analog instantaneous current value that indicates the level of the current by way of an equivalent, such as a voltage (voltage signal), the level of the voltage representing the level of the current. By way of example, an analog instantaneous current value is an analog measured value of the current that is available as a voltage signal representing the current characteristic as an equivalent.

Instantaneous current threshold value means for example an analog instantaneous current threshold value that indicates the level of the current by way of an equivalent, such as a voltage (voltage signal), the level of the voltage representing the level of the current. By way of example, the analog instantaneous current threshold value is an analog signal that is available as a voltage (signal) representing the instantaneous current threshold value (characteristic) as an equivalent.

In one advantageous configuration of the invention, the circuit breaker device is configured in such a way that the at least one current threshold value is digitally computed (by the control unit or for example by a microprocessor or microcontroller contained therein), the computed digital current threshold value is converted into an analog current threshold value using a digital-to-analog converter, and the analog current threshold value is supplied to the comparator.

This has the particular advantage that the processing speed of an analog circuit (typically in the region of a few nanoseconds [ns], e.g. 5-10 ns) is combined with the flexibility of a digital programmable and intelligent system (e.g. microprocessor/microcontroller).

The analog comparator operates continuously over time, that is to say not discretely over time. The detection of an overcurrent (current threshold value exceeded) is thus possible in a very short time. A microprocessor/microcontroller operates as a discrete-time controller, and so the reaction time is limited to the processing cycle, which is typically in the region of 10-100 μs.

This combination allows the flexibility and adjustability of a digital (instantaneous) current threshold value to be preserved and at the same time the high reaction time of the analog circuit to be attained. This is possible because the adjustment of the current threshold value does not have to happen in the nanosecond range/ns; only the comparison thereof with the (present) instantaneous value of the current value should be performed in the ns range, which is possible as a result of this arrangement/combination.

In one advantageous configuration of the invention, the circuit breaker device is configured in such a way that the level of the voltage is converted into a digital voltage value, the digital voltage value is normalized to its amplitude value, the absolute value is subsequently calculated, the absolute value is then multiplied by a first factor (k1) and a minimum value (k2) is subsequently added, and the resulting result yields a scaling factor (FM(t)) for the at least one current threshold value, which is multiplied by the at least one current threshold value in order to obtain an adjusted current threshold value (which is variable over time).

This has the particular advantage that there is a particularly simple computation or adjustment of the current threshold value on the basis of the level of the voltage.

In one advantageous configuration of the invention, the circuit breaker device is configured in such a way that the level of the voltage is converted into a digital voltage value, the absolute value of the voltage value is subtracted from the amplitude of the voltage value, the result is subsequently multiplied by a factor (k3), and the resulting result yields a correction value that is deducted from the at least one current threshold value in order to obtain an adjusted current threshold value (which is variable over time).

This has the particular advantage that there is a further particularly simple computation or adjustment of the current threshold value on the basis of the level of the voltage.

In one advantageous configuration of the invention, (periodic) instantaneous current threshold values, which are dependent on the (periodic) time characteristic of the level of the voltage (AC voltage), i.e. on the instantaneous voltage values, are available. The instantaneous current values are compared with the instantaneous current threshold values (in particular in a phase-related manner). The exceeding of the instantaneous current threshold value (in terms of absolute value) results in interruption of the low-voltage circuit being initiated.

This has the particular advantage that threshold values/current threshold values that are dependent on the periodicity of the voltage are available in order to attain fast prevention of current flow (tripping), in particular by the electronic interruption unit. Low current threshold values are used for low voltages and high current threshold values are used for high voltages.

In one advantageous configuration of the invention, the (periodic) instantaneous current threshold values have a minimum value that is greater than zero. In particular, this minimum value is in the region of 5 to 20% of the maximum value, i.e. the maximum current threshold value.

This has the particular advantage that reliable and fast detection of short-circuit currents is facilitated for low current threshold values and low voltages and instances of false tripping are prevented.

In one advantageous configuration of the invention, the low-voltage circuit has a voltage characteristic that is sinusoidal over time (ideal case). In particular, the low-voltage circuit is a low-voltage AC circuit. The instantaneous current threshold values likewise have a, in particular absolute-value, current characteristic that is (approximately) sinusoidal over time, wherein in particular the zero crossing or the region of the zero crossing has a (absolute-value) minimum value that is greater than zero; in particular the minimum value is in the region of 5 to 20% of the maximum value, i.e. of the maximum current threshold value. The time characteristics of the voltage and of the current threshold values are synchronized in a phase-related manner in such a way that the time of the amplitude (maximum value) of the voltage matches the time of the amplitude (maximum value) of the current threshold value.

This has the particular advantage that simple detection is facilitated in the case of (in particular) sinusoidal voltage characteristics. This is particularly advantageous for low-voltage AC circuits.

In particular, the region of the zero crossing of the voltage matches the region of the minimum value of the current threshold value.

In one advantageous configuration of the invention, the circuit breaker device is configured in such a way that the control unit comprises an analog first subunit and a digital second subunit. The first subunit comprises an (analog) (current) comparator, to which the instantaneous (analog) current values and the instantaneous (analog) current threshold values are supplied, the latter in particular by the second subunit. The current threshold values are provided by the second subunit in a phase-related manner in accordance with the time characteristic of the voltage. This facilitates a comparison of the instantaneous current values with the instantaneous current threshold values in a phase-related manner with respect to the time characteristic of the voltage, allowing interruption of the low-voltage circuit to be initiated if the (instantaneous) current threshold values are exceeded.

This has the particular advantage of a simple implementation of the solution.

In one advantageous configuration of the invention, the circuit breaker device is configured in such a way that there is provision for a grid synchronization unit. The latter uses the supplied instantaneous voltage values to ascertain at least one phase angle (q(t)) of the voltage and alternatively the amplitude (U) of the voltage. There is provision for a threshold value unit connected to the grid synchronization unit, with the result that the phase angle (φ(t)) of the voltage, the amplitude (U) of the voltage and a maximum limit value/threshold value for the current threshold value can be used to ascertain=>instantaneous current threshold values. The instantaneous current values are compared with the instantaneous current threshold values in a phase-related manner in order to ascertain the initiation of prevention of a flow of current (interruption).

This has the particular advantage of a further simple implementation of the invention.

Advantageously, prevention of the flow of current is primarily initiated by the electronic interruption unit. Additionally, or if further criteria are available, an electrical interruption can be initiated by the mechanical isolating contact system.

A corresponding method for a circuit breaker device for a low-voltage circuit having electronic (semiconductor-based) switching elements with the same and further advantages is claimed according to the invention.

In the case of the method for protecting an electrical low-voltage circuit in a circuit breaker device having a mechanical isolating contact unit connected in series with an electronic interruption unit,

- wherein the mechanical isolating contact unit can be switched by opening contacts in order to prevent a flow of current or by closing the contacts for a flow of current in the low-voltage circuit,
- wherein the electronic interruption unit can be switched by semiconductor-based switching elements to a high-impedance state of the switching elements in order to prevent a flow of current or to a low-impedance state of the switching elements for the purpose of current flow in the low-voltage circuit,
- wherein the level of the voltage of the low-voltage circuit is ascertained, in such a way that instantaneous voltage values are available,
- wherein the level of the current of the low-voltage circuit is ascertained, in such a way that (analog) instantaneous current values are available,
- wherein (in particular the absolute value of) the instantaneous current value exceeding (in particular the absolute value of the) at least one current threshold value results in prevention of the flow of current in the low-voltage circuit being initiated,
- the at least one current threshold value is adjusted on the basis of the level of the voltage in the circuit breaker device.

In one advantageous configuration of the invention, the at least one current threshold value is adjusted on the basis of the level of the voltage in such a way that decreasing voltage results in the at least one current threshold value being lowered and that increasing voltage results in the at least one current threshold value being raised, in particular being raised up to a maximum value of the at least one current threshold value.

A corresponding computer program product is claimed according to the invention. The computer program product comprises commands that, when the program is executed by a microcontroller (=microprocessor), cause the latter to improve the safety of such a circuit breaker device, or to attain greater safety in the electrical low-voltage circuit to be protected by the circuit breaker device, specifically in such a way that the electronic interruption unit reliably prevents a flow of electric current. The microcontroller (=microprocessor) is part of the circuit breaker device, in particular the control unit.

A corresponding computer-readable storage medium on which the computer-program product is stored is claimed according to the invention.

A corresponding data carrier signal that transmits the computer program product is claimed according to the invention.

All configurations, both in dependent form, referring back to the independent claims, and referring back only to individual features or combinations of features of patent claims, result in an improvement in a circuit breaker device for rapidly and reliably breaking in the event of overcurrents and short circuits and prevent thermal destruction of the employed semiconductor-based switching elements in the event of overcurrents or short circuits.

The properties, features and advantages of this invention that are described and the way in which they are achieved will become clearer and more distinctly comprehensible in conjunction with the description of the exemplary embodiments that follows, said exemplary embodiments being explained more thoroughly in conjunction with the drawing, in which:

DETAILED DESCRIPTION OF THE INVENTION

Figure 1:
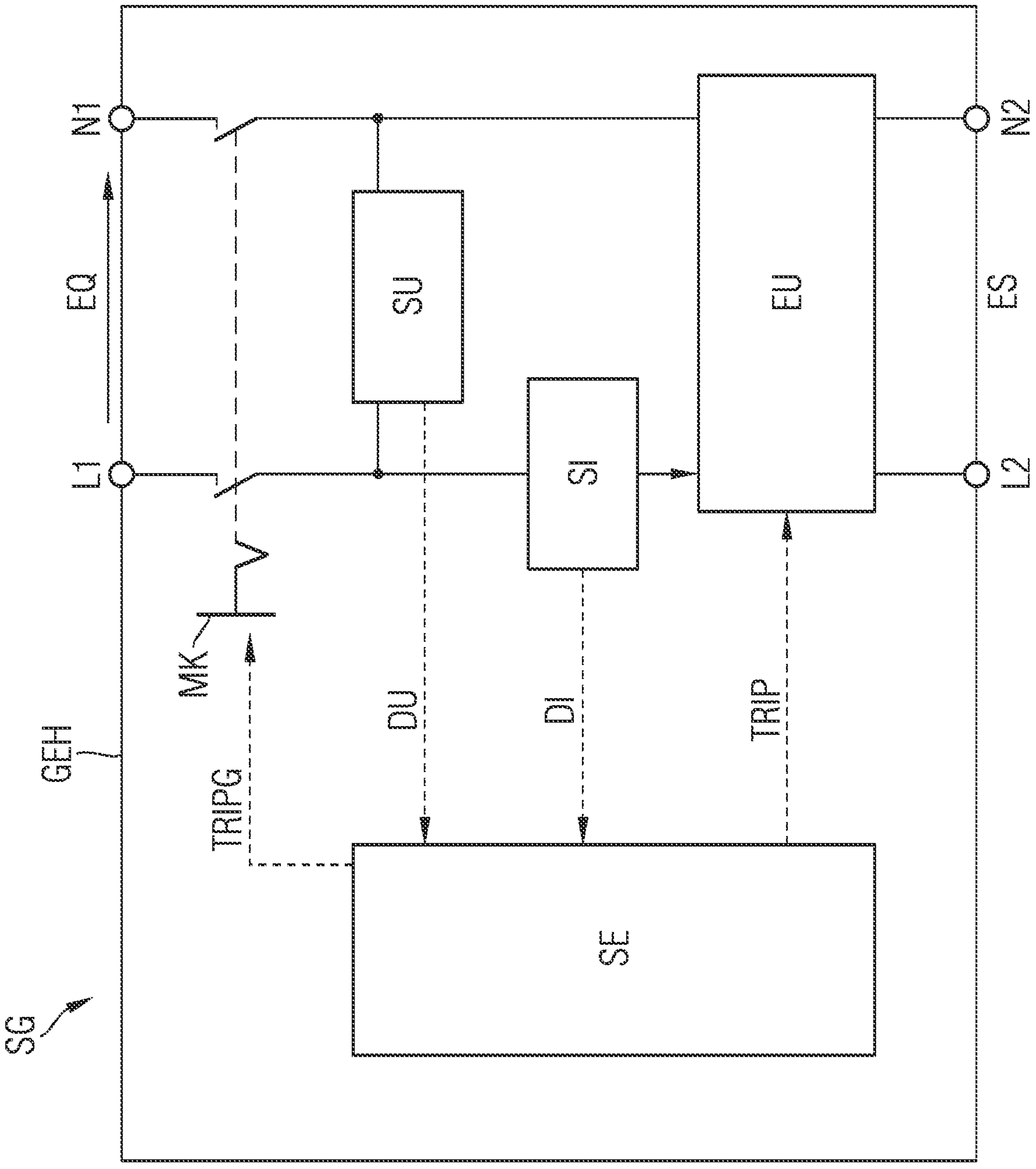
FIG. 1 shows a first representation of a circuit breaker device.

FIG. 1 shows a representation of a circuit breaker device SG for protecting an electrical low-voltage circuit, in particular low-voltage AC circuit, having a housing GEH, comprising:

- connections for conductors of the low-voltage circuit, in particular first connections L1, N1 for a grid-side, in particular energy-source-side, connection EQ of the circuit breaker device SG and second connections L2, N2 for a load-side, in particular energy-sink-side—in the case of passive loads —, connection ES (load-side connection) of the circuit breaker device SG, there being able to be provision for specifically phase-conductor-side connections L1, L2 and neutral-conductor-side connections N1, N2;
- the load-side connection can comprise a passive load or/and an active load ((further) energy source), or a load that can be both passive and active, e.g. sequentially in time;
- a voltage sensor unit SU in order to ascertain the level of the voltage of the low-voltage circuit, with the result that instantaneous voltage values (phase-related voltage values) DU are available; instantaneous (phase-angle-related) voltage values mean in particular analog instantaneous voltage values, i.e. for example an analog equivalent indicating the level of the voltage, for example an analog voltage whose level corresponds to that of the voltage,
- a current sensor unit SI in order to ascertain the level of the current of the low-voltage circuit, in such a way that instantaneous (phase-angle-related) current values DI are available;
- instantaneous (phase-angle-related) current values mean in particular analog instantaneous current values, i.e. for example an analog equivalent indicating the level of the current, for example an analog voltage whose level corresponds to that of the electric current,
- an electronic interruption unit EU that, as a result of semiconductor-based switching elements, has a high-impedance state for the switching elements for the purpose of preventing (in particular interrupting) a flow of current and a low-impedance state for the switching elements for the purpose of current flow in the low-voltage circuit,
- a mechanical isolating contact unit MK that can be switched by opening contacts in order to prevent a flow of current or by closing the contacts for a flow of current in the low-voltage circuit,
- a control unit SE connected to the voltage sensor unit SU, to the current sensor unit SI, to the mechanical isolating contact unit MK and to the electronic interruption unit EU.

The mechanical isolating contact unit MK is electrically connected in series with the electronic interruption unit EU.

The control unit SE can:

- be produced with a digital circuit, e.g. with a microprocessor; the microprocessor can also contain an analog part;
- be produced with a digital circuit having analog circuit parts.

The circuit breaker device SG, in particular the control unit SG, is configured in such a way that the exceeding of at least one current threshold value results in prevention of a flow of current in the low-voltage circuit being initiated, in particular being initiated in a first step by the electronic interruption unit EU.

That is to say that the exceeding of at least one current threshold value, which is generally caused by an, in particular load-side (ES), short circuit, results in the electronic interruption unit EU being switched from the low-impedance state to the high-impedance state in order to interrupt the low-voltage circuit.

The circuit breaker device is configured in such a way that the at least one current threshold value is adjusted on the basis of the level of the voltage in the low-voltage circuit.

That is to say that there is provision for at least one current threshold value, the exceeding of which (in particular in terms of absolute value) results in prevention of a flow of current in the low-voltage circuit being initiated. This one current threshold value is then adjusted on the basis of the level of the voltage. This would provide a simple solution for the invention.

There may also be provision for multiple current threshold values; in particular, there may be provision for instantaneous/phase-angle-related current threshold values, with the result that an instantaneous or phase-angle-related comparison is performed on the basis of the phase angle of the voltage or of the electric current. These instantaneous or phase-angle-related current threshold values can then be adjusted on the basis of the level of the voltage. In particular in a low-voltage AC circuit, an adjusted instantaneous or phase-angle-related current threshold value (or a set of adjusted current threshold values for every half-cycle—adjustment every 10 ms in a low-voltage AC circuit at a grid frequency of 50 Hz) can then be made available quickly, for example for the range of rising or falling instantaneous values of the voltage.

A comparison can be made by virtue of (periodic) instantaneous current threshold values that are dependent on the (periodic) time characteristic of the level of the voltage or of the ascertained instantaneous voltage values being available.

The instantaneous current threshold values can be available continuously or in relation to phase angle.

The instantaneous current threshold values may be present for each individual phase angle, a phase angle range (multiple phase angles), e.g. every 2°, or a phase angle section (part of a phase angle), e.g. every 0.5° or 0.1°. In particular, a resolution of 1° to 5° is particularly advantageous (this corresponds to a sampling rate of 3.5 to 20 kHz).

The instantaneous current values are compared with the instantaneous current threshold values in a phase-related manner. If the absolute value of the instantaneous current threshold value is exceeded by the absolute value of the instantaneous current value, interruption of the low-voltage circuit is initiated, e.g. by way of a first interrupt signal TRIP from the control unit SE to the electronic interruption unit EU, as shown in FIG. 1.

The electronic interruption unit EU is shown as a block in the two conductors in FIG. 1. In a first variant, this means no interruption of the two conductors. At least one conductor, in particular the active conductor or phase conductor, has semiconductor-based switching elements. The neutral conductor can be free of switching elements, i.e. without semiconductor-based switching elements. That is to say that the neutral conductor is connected directly, i.e. does not acquire high impedance. That is to say that only single-pole interruption (of the phase conductor) takes place. If there is provision for further active conductors/phase conductors, then, in a second variant of the electronic interruption unit EU, the phase conductors have semiconductor-based switching elements. The neutral conductor is connected directly, i.e. does not acquire high impedance. By way of example, for a three-phase AC circuit.

In a third variant of the electronic interruption unit EU, the neutral conductor can likewise have a semiconductor-based switching element, i.e. interruption by the electronic interruption unit EU results in both conductors acquiring high impedance.

The electronic interruption unit EU can comprise semiconductor components such as bipolar transistors, field-effect transistors (FETs), isolated gate bipolar transistors (IGBTs), metal oxide layer field-effect transistors (MOSFETs) or other (self-commutated) power semiconductors. In particular IGBTs and MOSFETs are particularly suitable for the circuit breaker device according to the invention owing to low flow resistances, high junction resistances and good switching behavior.

The circuit breaker device SG can preferably comprise a mechanical isolating contact system MK according to the standard with standard-compliant isolator properties, for electrical isolation of the circuit, in particular for standard-compliant isolation (as opposed to breaking) of the circuit. The mechanical isolating contact system MK is connected to the control unit SE, as shown in FIG. 1, with the result that the control unit SE can initiate electrical isolation of the circuit.

Specifically, further evaluation may be implemented that brings about electrical isolation if other criteria are satisfied. By way of example, there may be provision for overcurrent detection, for example in the control unit SE, that carries out semiconductor-based or/and electrical interruption of the circuit in the event of overcurrents, i.e. when current-time limit values are exceeded, i.e. when a current that exceeds a current limit value is present for a specific time, i.e. for example a specific energy threshold value is exceeded.

Alternatively or additionally, a detected short circuit can also result in electrical isolation being initiated, for example.

The electrical interruption of the low-voltage circuit is initiated for example by a further second interrupt signal TRIPG that is transmitted from the control unit SE to the mechanical isolating contact system MK, as shown in FIG. 1.

In a first variant, the mechanical isolating contact system MK can interrupt on a single-pole basis. That is to say that only one conductor of the two conductors, in particular the active conductor or phase conductor, is interrupted, i.e. has a mechanical contact. The neutral conductor is then free of contacts, i.e. the neutral conductor is connected directly.

If there is provision for further active conductors/phase conductors, then, in a second variant, the phase conductors have mechanical contacts of the mechanical isolating contact system. In this second variant, the neutral conductor is connected directly. By way of example, for a three-phase AC circuit.

In a third variant of the mechanical isolating contact system MK, the neutral conductor likewise has mechanical contacts, as shown in FIG. 1.

Mechanical isolating contact system MK means in particular a (standard-compliant) isolating function, provided by the isolating contact system MK. Isolating function means the points:

- minimum air gap according to the standard (minimum distance between the contacts),
- contact position indication for the contacts of the mechanical isolating contact system,
- opening of the mechanical isolating contact system always possible (no locking of the isolating contact system by the handle), so-called trip-free mechanism.

With regard to the minimum air gap between the contacts of the isolating contact system, this is substantially voltage-dependent. Other parameters are the degree of soiling, the type of field (homogeneous, inhomogeneous) and the air pressure or the height above sea level.

There are appropriate regulations or standards for these minimum air gaps or creepage distances. In air, for example, these regulations indicate the minimum air gap for a surge withstand capability for an inhomogeneous and a homogeneous (ideal) electrical field on the basis of the degree of soiling. The surge withstand capability is the strength when an applicable surge voltage is applied. Only if this minimum length (minimum distance) exists does the isolating contact system or circuit breaker device have an isolating function (isolator property).

Within the context of the invention, the series of standards DIN EN 60947, or IEC 60947, which are mentioned here by way of reference, is relevant to the isolator function and the properties thereof in this instance.

The isolating contact system is advantageously characterized by a minimum air gap between the open isolating contacts in the OFF position (open position, open contacts) on the basis of the rated surge withstand capability and the degree of soiling. The minimum air gap is in particular between (a minimum of) 0.01 mm and 14 mm. In particular, the minimum air gap is advantageously between 0.01 mm at 0.33 kV and 14 mm at 12 kV, in particular for degree of soiling 1 and in particular for inhomogeneous fields.

The minimum air gap can advantageously have the following values:

E DIN EN 60947-1 (VDE 0660-100):2018-06

TABLE 13 minimum air gaps

| Rated surge withstand capability $U_{imp}$ | Minimum air gaps mm — Case A inhomogeneous field (see 3.7.63) Degree of soiling | | | | Case B homogeneous field, ideal conditions (see 3.7.62) Degree of soiling | | | |
|---|---|---|---|---|---|---|---|---|
| kV | 1 | 2 | 3 | 4 | 1 | 2 | 3 | 4 |
| 0.33 | 0.01 | | | | 0.01 | | | |
| 0.5 | 0.04 | 0.2 | | | 0.04 | 0.2 | | |
| 0.8 | 0.1 | | 0.8 | | 0.1 | | 0.8 | 1.6 |
| 1.5 | 0.5 | 0.5 | | 1.6 | 0.3 | 0.3 | | |
| 2.5 | 1.5 | 1.5 | 1.5 | | 0.6 | 0.6 | | |
| 4.0 | 3 | 3 | 3 | 3 | 1.2 | 1.2 | 1.2 | |
| 6.0 | 5.5 | 5.5 | 5.5 | 5.5 | 2 | 2 | 2 | 2 |
| 8.0 | 8 | 8 | 8 | 8 | 3 | 3 | 3 | 3 |
| 12 | 14 | 14 | 14 | 14 | 4.5 | 4.5 | 4.5 | 4.5 |

NOTE
The smallest air gaps indicated are based on the 1.2/50-μs surge voltage at an air pressure of 80 kPa, corresponding to the air pressure at 2000 m above sea level.

The degrees of soiling and types of field are consistent with those defined in the standards. This advantageously allows a standard-compliant circuit breaker device dimensioned according to the rated surge withstand capability to be achieved.

Figure 2:
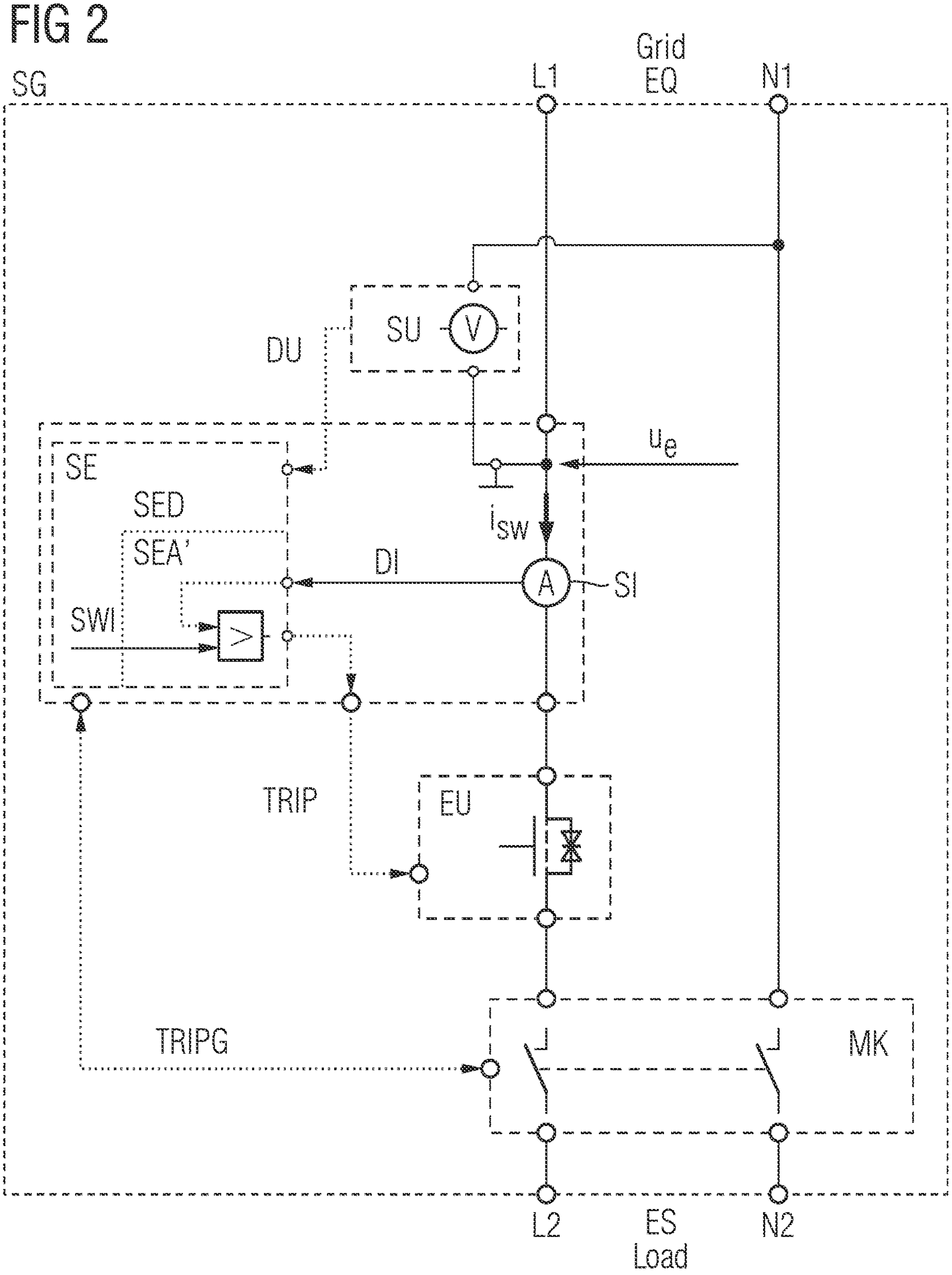
FIG. 2 shows a second representation of a circuit breaker device.

FIG. 2 shows a representation based on FIG. 1, with the difference that (in the case of the series circuit comprising the mechanical isolating contact unit MK and the electronic interruption unit EU) the mechanical isolating contact unit MK is advantageously associated with the load-side connections and the electronic interruption unit EU is associated with the grid-side connections. Furthermore, the electronic interruption unit EU is embodied as a single-pole electronic interruption unit EU, i.e. in the example is provided in the phase conductor, i.e. between the connections L1, L2. The electronic interruption unit EU also comprises (at least) one semiconductor-based switching element (=power semiconductor), as indicated in FIG. 2. The semiconductor-based switching element further comprises an overvoltage protection element, as is likewise indicated in FIG. 2. The control unit SE comprises an analog first subunit SEA and a digital second subunit SED. The digital second subunit SED may be a microprocessor or digital signal processor (DSP), for example. The analog first subunit SEA comprises at least one (current) comparator, as indicated in FIG. 2.

Figure 3:
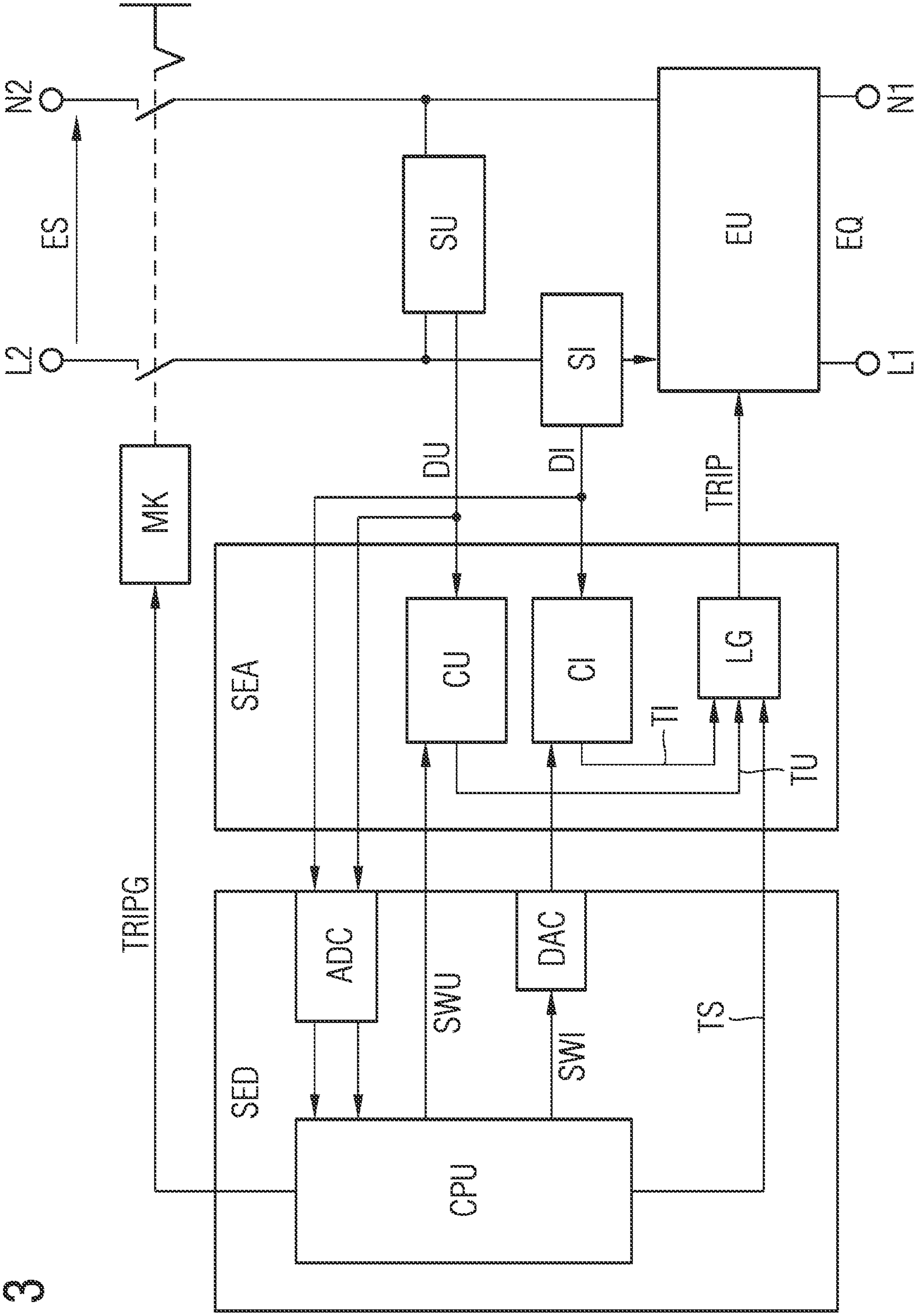
FIG. 3 shows a first configuration of the circuit breaker device.

FIG. 3 shows a representation based on FIGS. 1 and 2, with a further detailed configuration. The control unit SE comprises two subunits, a, preferably analog, first subunit SEA and a, preferably digital, second subunit SED. The first subunit SEA comprises an analog (current) comparator CI. This is firstly supplied with the instantaneous current values DI from the current sensor unit SI. Secondly, the current comparator CI (in the example) is supplied with (a current threshold value or) the instantaneous current threshold values SWI from the second subunit SED.

Current comparator in this instance means a comparator that compares two (current) variables with one another, with in particular equivalents of the level of the current being compared with one another in this instance (e.g. two voltages, the voltage level of each of which represents the current level or the level of the current threshold value).

The (analog) instantaneous current threshold values are in particular an analog voltage characteristic.

The current comparator CI compares the instantaneous current values DI with the instantaneous current threshold values SWI and, as described, delivers a first current interrupt signal TI, in order to initiate interruption of the low-voltage circuit, if the threshold values are exceeded (in particular in terms of absolute value).

The current interrupt signal TI can be supplied to a logic unit LG, which combines it with other interrupt signals and delivers the first interrupt signal TRIP to the electronic interruption unit EU for the purpose of semiconductor-based interruption or high-impedance interruption.

The analog (current) comparator allows in particular immediate, i.e. very fast, detection of the overshoot; this normally takes place in the ns range, i.e. between 1 and 100 ns.

By comparison, a digital system would currently react in the μs range, that is to say for example between 2-100 μs, due to the computation and reaction times.

In one configuration, the current comparator CI buffer-stores the instantaneous (current) threshold values SWI in order to have the values constantly available.

Wherein the instantaneous current threshold values SWI are in sync with the time characteristic of the instantaneous voltage values (the time characteristic of the voltage). As a result, low instantaneous current threshold values SWI are used (or available) for low instantaneous voltage (phase angle of a sinusoidal AC voltage from e.g. −30° to 0° to 30°) and high current threshold values SWI are used (or available) for high instantaneous voltage (phase angle of a sinusoidal AC voltage from e.g. 60° to 90° to 120°). As a result, by way of example, the tripping time is advantageously largely independent of the phase angle of the voltage, and so the tripping time is below a temporal first threshold value.

The analog instantaneous current values DI and the analog instantaneous voltage values DU are also supplied to the second subunit SED. In one preferred configuration, the instantaneous current values DI or/and instantaneous voltage values DU are digitized by an analog-to-digital converter ADC there and supplied to a microprocessor (=microcontroller) CPU. The latter ascertains or computes the instantaneous current threshold values SWI, depending on the level of the voltage/the supplied instantaneous voltage values DU. The instantaneous current threshold values SWI ascertained by the second subunit SED or in particular the microprocessor CPU are in turn supplied to the first subunit SEA, in particular the current comparator CI, by a digital-to-analog converter (DAC) in order to perform the comparison described above.

The second subunit SED or the first subunit SEA can comprise a digital-to-analog converter DAC in order to convert the (digital) current threshold values SWI computed in the second subunit SED into analog current threshold values SWI, in order to perform an analog comparison in the first analog subunit SEA. In the example shown in FIG. 3, the digital-to-analog converter DAC is part of the second (digital) subunit SED (or associated therewith).

The instantaneous current threshold values SWI can advantageously be digitally ascertained in the second subunit SED, or at a slower processing speed than the ongoing comparison of analog instantaneous current values DI with the analog instantaneous current threshold values SWI in the first subunit SEA. This is advantageous because the analog comparison of the current values with the current threshold values by means of the comparator takes place more quickly than the processing time or computation time in the digital second subunit SED.

The comparison in exact phases is generally ensured by the fast processing speeds of the analog-to-digital converter ADC, the microprocessor (=microcontroller) CPU and the digital-to-analog converter DAC compared with the frequency of the low-voltage circuit, which is normally 50 Hz in Europe.

In one advantageous configuration of the invention, the first subunit SEA can comprise a voltage comparator CU. This is firstly supplied with the instantaneous voltage values DU of the voltage sensor SU. Secondly, the voltage comparator CU is supplied with instantaneous voltage threshold values SWU from the second subunit SED.

The voltage comparator CU compares the instantaneous voltage values DU with the instantaneous voltage threshold values SWU and delivers a voltage interrupt signal TU in order to initiate interruption of the low-voltage circuit if the threshold values are exceeded or undershot or in the event of a range check.

The voltage interrupt signal TU can be supplied to the logic unit LG, which combines it with the (other) interrupt signal(s) and delivers the first interrupt signal TRIP to the electronic interruption unit EU for the purpose of semiconductor-based interruption or high-impedance interruption.

In one configuration, the voltage comparator CU buffer-stores the instantaneous threshold values SWU in order to have the values constantly available.

In one configuration, the microprocessor CPU ascertains or computes the instantaneous voltage threshold values SWU. The instantaneous voltage threshold values SWU ascertained by the second subunit SED or in particular the microprocessor CPU are in turn supplied to the first subunit SEA, in particular to the voltage comparator CU, in order to perform the comparison described above. The digital instantaneous voltage threshold values SWU can be converted into analog instantaneous voltage threshold values SWU by a further digital-to-analog converter, which is not shown. Said analog instantaneous voltage threshold values are compared with the analog instantaneous voltage values DU using the voltage comparator CU.

The instantaneous voltage threshold values SWU can advantageously be digitally ascertained in the second subunit SED, or at a slower processing speed than the ongoing comparison of instantaneous voltage values DU and instantaneous voltage threshold values SWU in the first subunit SEA.

Depending on the configuration, a second interrupt signal TRIPG can be delivered to the mechanical isolating contact system MK by the second subunit SED of the control unit SG, in particular by the microprocessor CPU, in order to electrically interrupt the low-voltage circuit, as shown in FIG. 3.

The configuration of the control unit with an analog first subunit and a digital second subunit has the particular advantage that an efficient architecture is available. The first analog subunit can perform a very fast comparison of analog instantaneous values and analog threshold values, which allows fast short-circuit detection. The second subunit can compute threshold values, or make adjustments, independently thereof, according to the invention on the basis of the level of the voltage, which does not need to be performed as quickly as the detection. By way of example, the threshold values can be buffer-stored in order to be available for a fast comparison. The threshold values do not need to be constantly adjusted.

Figure 4:
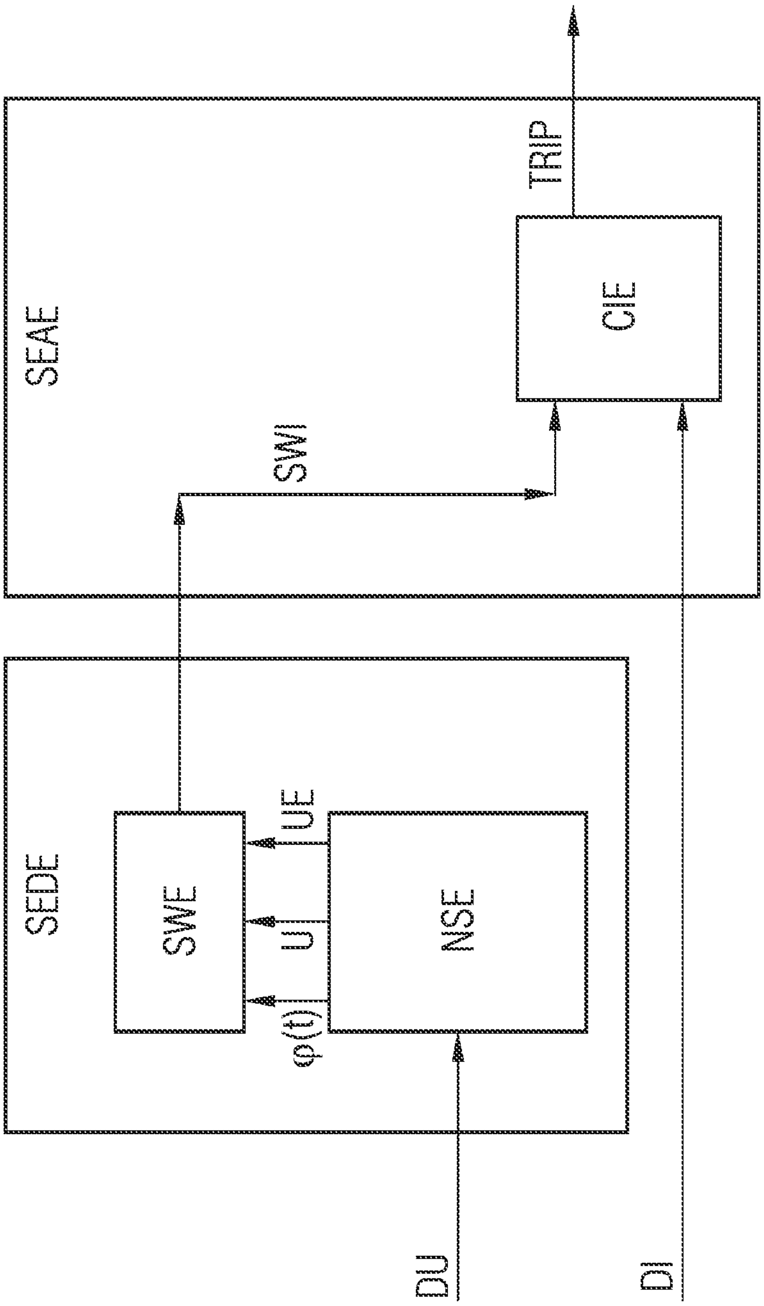
FIG. 4 shows a second configuration of the circuit breaker device.

FIG. 4 shows a further configuration or variant based on FIGS. 1 to 3. FIG. 4 shows a part of a simple variant of the, preferably analog, first subunit SEAE and a part of an alternative variant of the, preferably digital, second subunit SEDE.

The part of the simple variant of the first subunit SEAE comprises the current comparator CIE, to which the instantaneous current values DI, in particular the absolute value thereof, and the instantaneous current threshold values SWI, in particular likewise in absolute-value form, are supplied. In this example, the current comparator CIE delivers the first interrupt signal TRIP directly in order to interrupt the low-voltage circuit, analogously to the preceding figures. The absolute values can be calculated by a or further units, which are not shown.

The part of the alternative variant of the second subunit SEDE comprises a grid synchronization unit NSE. This is supplied with the (analog) instantaneous voltage values DU.

The grid synchronization unit NSE uses the supplied (analog) instantaneous voltage values DU, which are e.g. a sinusoidal AC voltage of the low-voltage circuit, to ascertain the phase angle $\varphi(t)$ of the voltage.

Alternatively, the amplitude U and an expected time value of the voltage UE, or expected value of the voltage UE, can additionally be ascertained.

The expected value of the voltage UE is a type of filtered or regenerated or generated equivalent instantaneous voltage value DU.

The phase angle $\varphi(t)$ (and the expected value of the voltage UE, or the amplitude U) of the voltage DU can be ascertained for example by what is known as a phase locked loop, PLL for short. A PLL is an electronic circuit arrangement (or a variant programmed in software in the microcontroller) that influences the phase and, in association therewith, the frequency of a variable oscillator by way of a closed control loop in such a way that the phase error between an external periodic reference signal (instantaneous voltage values) and the oscillator or a signal derived therefrom is as constant as possible.

It is thus possible to ascertain, among other things, the phase angle $\varphi(t)$, the fundamental frequency and the amplitude thereof for the supplied grid voltage, i.e. the ascertained voltage values, i.e. e.g. also the (unperturbed or filtered) expected value of the (grid) voltage.

The phase angle $\varphi(t)$ (and possibly the amplitude U or/and the expected time value of the voltage UE) ascertained by the grid synchronization unit NSE are supplied to a threshold value unit SWT. The threshold value unit SWT can have a (scaled) curve for the (phase-related) instantaneous current threshold values SWI. By way of example, in the case of a sinusoidal AC voltage of the low-voltage circuit, an (approximately) sinusoidal current threshold value curve, i.e. a characteristic that is sinusoidal in level for the instantaneous current threshold values SWI over the phase angle 0° to 360°, or the period duration (or the (corresponding) time).

The circuit breaker device SG can comprise an, in particular single, adjusting element. This, in particular single, adjusting element on the circuit breaker device SG can be used to set a limit value or maximum value for the current threshold value. Alternatively, the limit value or maximum value for the current threshold value may also be firmly predefined or programmed.

According to the invention, the current threshold value curve is then scaled in respect of this limit value or maximum value for the current threshold value that has been set by means of the adjusting element or has been firmly predefined. By way of example, the amplitude (or the maximum value) of the current threshold value curve can be scaled using the limit value/maximum value for the current threshold value.

By way of example, the maximum value of the current threshold value may be 4 times the amplitude of a nominal current (i.e. at least the current that the circuit breaker device needs to carry constantly, depending on the standard) of the circuit breaker device, for example conventional circuit breaker devices have a nominal current of e.g. 16 A. In the example, this results in a maximum value of the current threshold value of:

$$90\ A=(\text{root } 2)*16\ A*4.$$

(root 2=>amplitude of the nominal current value)

As a result of the presence of the phase angle $\varphi(t)$ of the voltage in the threshold value unit SWE, the instantaneous current threshold values SWI can be transferred from the latter to the current comparator CIE in sync with the instantaneous current value DI, with the result that a phase-related (phase-angle-related) comparison between the instantaneous current value DI and the instantaneous current threshold value SWI can take place.

Figure 5:
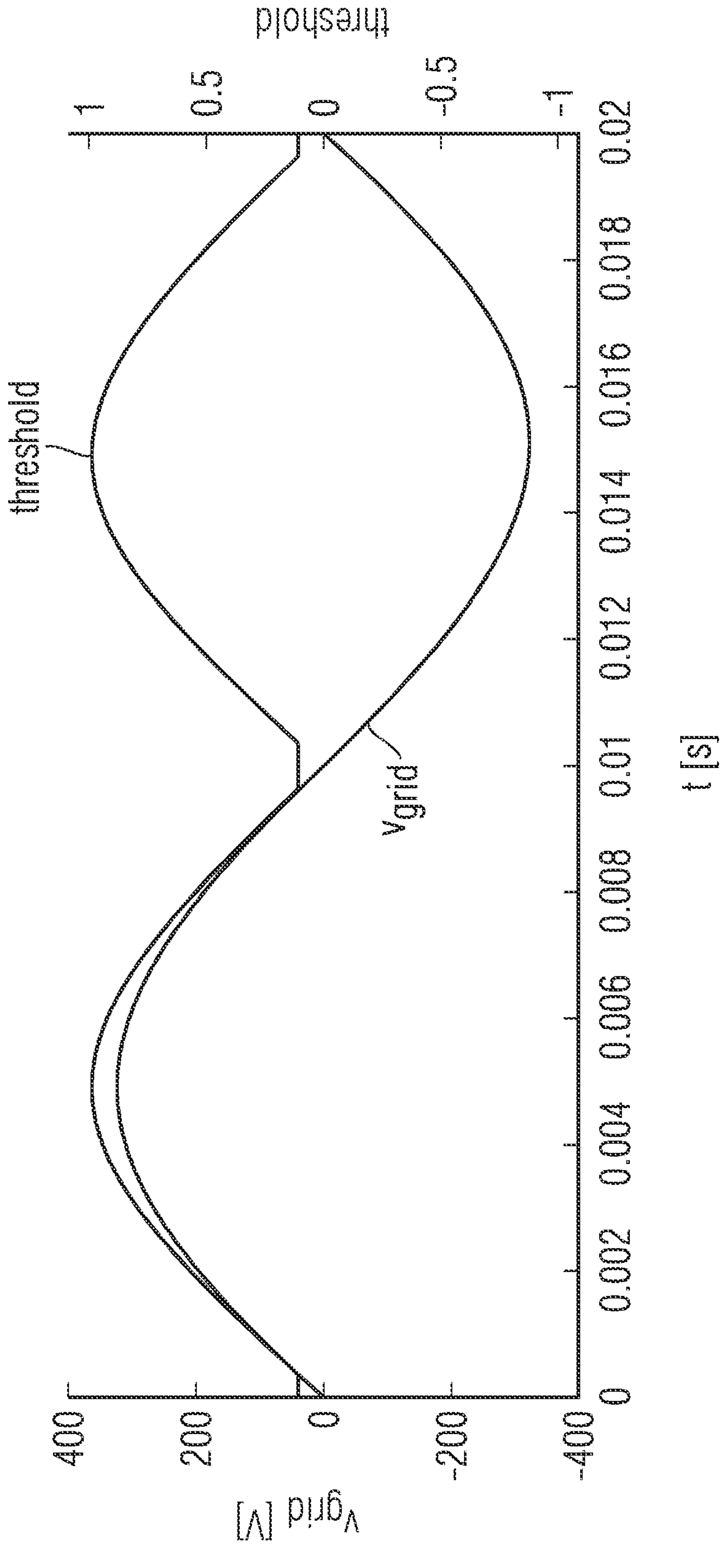
FIG. 5 shows voltage and current threshold value characteristics over time.

FIG. 5 firstly shows the characteristic of the level of a grid-side voltage Vgrid in volts [V], on the left-hand vertical axis, of a period of a sinusoidal AC voltage over time t in s [s], on the horizontal axis. By way of example, of a sinusoidal AC voltage in the low-voltage AC circuit. The instantaneous voltage values of the voltage over time are indicated in this case, the time being proportional to the phase angle (f=50 Hz).

Secondly, it shows a phase-angle-related or phase-angle-dependent (absolute-value) scaled (0 to 1) instantaneous current threshold, threshold, on the right-hand vertical axis, over time t in s [s]. The time (scaled) characteristic of the instantaneous current threshold values threshold corresponds to the (phase-related) instantaneous current threshold values SWI.

The time characteristic of the instantaneous current threshold value (threshold) is geared to the absolute-value characteristic of the voltage, i.e. the characteristic in the region of the positive voltage half-cycle is identical to the characteristic in the region of the negative voltage half-cycle.

The time (scaled) characteristic of the instantaneous current threshold values threshold is scaled, according to the invention, on the basis of the limit value/maximum value for the current threshold value that has been set by means of the adjusting element or has been firmly predefined. E.g. the amplitude (scaling 1) is set to 100 A, or e.g. 5 times the nominal current. For a nominal current of e.g. 16 A, e.g. to $$5*16A*1.414(\text{root } 2)=113 \text{ A}$$

(root 2=>peak value of the instantaneous value of the current).

In general, the characteristic of the instantaneous current threshold values threshold corresponds to the characteristic of the voltage in the circuit, as shown in FIG. 5. That is to say that in the case of a triangular voltage characteristic, for example, a triangular current threshold value curve would be used. The background is that the level of the voltage determines the level of the (short-circuit) current. According to the invention, low threshold values are therefore used for low voltage and high threshold values are used for high voltage, in order to facilitate fast, phase-angle-independent short-circuit detection.

According to FIG. 5, the (periodic) instantaneous current threshold values SWI have a minimum value. That is to say that the sine curve is not ideal (only approximately or roughly sinusoidal). The minimum value is greater than zero. The minimum value is in the range 5 to 20% of the maximum value, for example (is) 10% or 15%, i.e. of the amplitude, of the current threshold value curve threshold.

The minimum value occurs at the position or in the region of the zero crossing of the (sine) curve for the current threshold values.

In the case of a voltage characteristic that is sinusoidal over time in the low-voltage AC circuit, the time characteristics of the voltage and of the current threshold values are synchronized in a phase-related manner in such a way that the time of the amplitude (maximum value) of the voltage matches the time of the amplitude (maximum value) of the current threshold value, as shown in FIG. 5.

Furthermore, the region of the zero crossing of the voltage matches the region of the minimum value of the current threshold value.

The phase angle resolution determines the speed at which the threshold values are computed. At a phase angle resolution of 1°, i.e. for each full phase angle of the voltage, a threshold value is available, i.e. an instantaneous threshold value is available every 55.5 μs, for example. Breaking is preferably effected by way of an analog comparator, i.e. continuously, and is therefore distinctly faster (e.g. in the nanosecond range) than the phase angle resolution.

Alternatively, the following time characteristic applies for full digital processing. The phase angle resolution determines the speed of detection. If a threshold value is available at a phase angle resolution of 1°, i.e. for each full phase angle of the voltage, i.e. an instantaneous threshold value is available every 55.5 μs, for example, this means that breaking can take place after a minimum of approximately 60 μs. Shorter break times can be attained at higher phase angle resolutions.

In this example, the values are then processed at at least 18 kHz.

The current threshold values may also be stored (in scaled form) in a table, in which case the value may be adjusted.

By way of example, the current threshold values can be computed generally or in a table-related manner as follows:

The level of the voltage is converted into a digital voltage value.

The level of the voltage is converted into a digital voltage value, the digital voltage value is normalized to its amplitude value, the absolute value is subsequently calculated, the absolute value is then multiplied by a first factor (k1) and a minimum value (k2) is subsequently added, and the resulting result yields a scaling factor (FM(t)) for the at least one current threshold value, which is multiplied by the at least one current threshold value in order to obtain an adjusted current threshold value (which is variable over time).

The equation for the scaling factor in this regard is:

FM(t)—scaling factor

U_Grid(t)—instantaneous value of the voltage

U_amplitude—amplitude of the voltage (or maximum instantaneous value of the voltage)

$$FM(t)=k1(\text{abs}(u\_\text{Grid}(t)/U\_\text{amplitude}))+k2$$

$$\text{Current threshold value(new)}=FM(t)\text{current threshold value(old)}$$

Alternatively, the absolute value of the voltage value is subtracted from the amplitude of the voltage value, the result is subsequently multiplied by a factor (k3), and the resulting result yields a correction value that is deducted from the at least one current threshold value in order to obtain an adjusted current threshold value (which is variable over time).

The equation for the correction value FK(t) is:

$FK(t)$–correction value $$FK(t)=k3(U\_\text{amplitude}-\text{abs}(u\_\text{Grid}(t)))$$

Although the invention has been more thoroughly illustrated and described in detail by the exemplary embodiment, the invention is not restricted by the disclosed examples, and other variations can be derived therefrom by a person skilled in the art without departing from the scope of protection of the invention.

The invention claimed is:

1. A circuit breaker device for protecting an electrical low-voltage circuit, the circuit breaker device comprising:

a housing having first and second connections for conductors of the low-voltage circuit;

a series circuit having a mechanical isolating contact unit and an electronic interruption unit and electrically connecting said first and second connections;

said mechanical isolating contact unit being configured to be switched by opening contacts to prevent a current flow or by closing the contacts to allow a current flow in the low-voltage circuit;

said electronic interruption unit being configured to be switched by semiconductor-based switching elements to a high-impedance state of the switching elements in order to prevent a flow of current or to a low-impedance state of the switching elements to allow a current flow in the low-voltage circuit;

a current sensor unit for ascertaining a level of an instantaneous current of the low-voltage circuit to provide instantaneous current values;

a voltage sensor unit for ascertaining a level of a voltage in the low-voltage circuit to provide instantaneous voltage values;

a control unit connected to said current sensor unit, to said voltage sensor unit, to said mechanical isolating contact unit, and to said electronic interruption unit, and configured to initiate a prevention of a current flow in the low-voltage circuit when at least one current threshold value is exceeded; and wherein said control unit is configured to adjust the at least one current threshold value on a basis of the level of the voltage in the low-voltage circuit; and an analog comparator for comparing the instantaneous current value of the ascertained level of the current with the at least one current threshold value, wherein, when an absolute value of the level of the current exceeds an absolute value of the at least one current threshold value, the prevention of the current flow in the low-voltage circuit is initiated.

2. The circuit breaker device according to claim 1, wherein:

said first connections are grid-side connections and said second connections are load-side connections; and said mechanical isolating contact unit is associated with said load-side connections and said electronic interruption unit is associated with said grid-side connections.

3. The circuit breaker device according to claim 1, wherein the at least one current threshold value is adjusted by lowering the at least one current threshold when the voltage decreases and by raising the at least one current threshold when the voltage increases.

4. The circuit breaker device according to claim 3, wherein the at least one current threshold value is raised up to a maximum value of the at least one current threshold value.

5. The circuit breaker device according to claim 1, wherein the at least one current limit value is continually adjusted at a rate faster than 20 ms.

6. The circuit breaker device according to claim 1, wherein the at least one current limit value is continually adjusted at a rate faster than 1 ms.

7. The circuit breaker device according to claim 1, wherein:

the at least one current threshold value is digitally computed, the computed digital current threshold value is converted into an analog current threshold value using a digital-to-analog converter; and the analog current threshold value is supplied to said comparator.

8. The circuit breaker device according to claim 1, wherein said control unit is configured:

to convert the level of the voltage into a digital voltage value, to normalize the digital voltage value to an amplitude value thereof, to subsequently calculate the absolute value, to then multiply the absolute value by a first factor, and subsequently add a minimum value to yield a scaling factor for the at least one current threshold value; and to multiply the scaling factor by the at least one current threshold value in order to obtain an adjusted current threshold value.

9. The circuit breaker device according to claim 1, wherein said control unit is configured:

to convert the level of the voltage into a digital voltage value, to subtract the absolute value of the voltage value from the amplitude of the voltage value, and to subsequently multiply a result by a factor to yield a correction value; and to deduct the correction value from the at least one current threshold value in order to obtain an adjusted current threshold value.

10. The circuit breaker device according to claim 9, wherein:

the low-voltage circuit has a voltage characteristic that is sinusoidal over time;

the instantaneous current threshold values have current threshold value characteristic that is approximately sinusoidal over time, with a minimum value that is greater than zero;

time characteristics of the voltage and of the current threshold values are synchronized in a phase-related manner in such a way that a time of the amplitude of the voltage matches a time of the amplitude of the current threshold value.

11. The circuit breaker device according to claim 10, wherein the instantaneous current threshold values have an absolute-value current threshold value characteristic with a minimum value that is greater than 5 to 20% of a maximum value.

12. The circuit breaker device according to claim 10, wherein a zero crossing of the voltage matches a minimum value of the current threshold value.

13. The circuit breaker device according to claim 1, wherein:

instantaneous current threshold values are provided, which are dependent on a time characteristic of the instantaneous voltage values; and wherein said control unit is configured to compare the instantaneous current values with the instantaneous current threshold values in a phase-related manner, and, when an absolute value of the instantaneous current threshold value exceeds an absolute value of the instantaneous current threshold values, to initiate an interruption of the low-voltage circuit.

14. The circuit breaker device according to claim 1, wherein the instantaneous current threshold values are periodic instantaneous current threshold values, which are dependent on a periodic time characteristic of the instantaneous voltage values.

15. A method for protecting an electrical low-voltage circuit in a circuit breaker device, the method comprising:

providing the circuit breaker device with a mechanical isolating contact unit that is connected in series with an electronic interruption unit;

wherein the mechanical isolating contact unit is configured to be switched by opening contacts so as to prevent a current flow or closing the contacts to allow a current flow in the low-voltage circuit;

wherein the electronic interruption unit is configured to be switched by semiconductor-based switching elements to a high-impedance state of the switching elements to avoid a current flow or to a low-impedance state of the switching elements to allow the current flow in the low-voltage circuit;

ascertaining a level of a voltage of the low-voltage circuit to provide instantaneous voltage values;

ascertaining a level of a current of the low-voltage circuit to provide instantaneous current values;

when an absolute value of the instantaneous current value exceeds at least one current threshold value, initiating a prevention of the current flow in the low-voltage circuit;

adjusting the at least one current threshold value on a basis of the level of the voltage in the circuit breaker device; and comparing, with an analog comparator, the instantaneous current value of the ascertained level of the current with the at least one current threshold value, wherein, when an absolute value of the level of the current exceeds an absolute value of the at least one current threshold value, the prevention of the current flow in the low-voltage circuit is initiated.

16. The method according to claim 15, wherein the adjusting step comprises adjusting the at least one current threshold value based on the level of the voltage such that a decreasing voltage results in a lowering of the at least one current threshold value and an increasing voltage results in an increase of the at least one current threshold value.

17. The method according to claim 16, wherein the adjusting step comprises adjusting the at least one current threshold value to a maximum value of the at least one current threshold value.

18. A computer-readable storage medium storing thereon a non-transitory computer program product which, when a corresponding computer program is executed on a computer, is configured to execute the method according to claim 15.

* * * * *